US012468305B2

(12) United States Patent
Choi et al.

(10) Patent No.: US 12,468,305 B2
(45) Date of Patent: Nov. 11, 2025

(54) ELECTRONIC DEVICE AND METHOD FOR CONTROLLING THEREOF

(71) Applicant: SAMSUNG ELECTRONICS CO., LTD., Suwon-si (KR)

(72) Inventors: Mideum Choi, Suwon-si (KR); Hyomuk Kim, Suwon-si (KR); Jewoong Ryu, Suwon-si (KR); Aron Baik, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 39 days.

(21) Appl. No.: 18/213,959

(22) Filed: Jun. 26, 2023

(65) Prior Publication Data

US 2023/0333567 A1 Oct. 19, 2023

Related U.S. Application Data

(63) Continuation of application No. PCT/KR2022/012566, filed on Aug. 23, 2022.

(30) Foreign Application Priority Data

Sep. 14, 2021 (KR) .................. 10-2021-0122732

(51) Int. Cl.
  *G05D 1/00* (2024.01)
(52) U.S. Cl.
  CPC ......... *G05D 1/0248* (2013.01); *G05D 1/0214* (2013.01); *G05D 1/0274* (2013.01)
(58) Field of Classification Search
  CPC .. G05D 1/0248; G05D 1/0214; G05D 1/0274; G05D 1/024; G05D 1/0212;
  (Continued)

(56) References Cited

U.S. PATENT DOCUMENTS 5,835,684 A  11/1998  Bourne et al.
7,684,894 B2  3/2010  Sakai et al.
(Continued)

FOREIGN PATENT DOCUMENTS

EP  0 738 199 B1  3/2000
JP  5518579 B2  6/2014
(Continued)

OTHER PUBLICATIONS

Fox, Dieter et al., "The Dynamic Window Approach to Collision Avoidance", 1997. (23 pages total).
(Continued)

*Primary Examiner* — Bao Long T Nguyen
(74) *Attorney, Agent, or Firm* — Sughrue Mion, PLLC

(57) ABSTRACT

Disclosed are an electronic device and a method for controlling thereof. A method of controlling an electronic device includes identifying a first traveling path heading to a preset destination based on a map corresponding to an environment in which an electronic device operates; identifying an object interfering with traveling according to the first traveling path based on at least one sensor while traveling according to the first traveling path; identifying an avoidance path to avoid the object based on at least one of a location and speed of the identified object and traveling according to the avoidance path; and based on the identified object being distant by a preset distance or more based on traveling according to the avoidance path, controlling the electronic device to travel according to the first traveling path based on a current location of the electronic device.

20 Claims, 15 Drawing Sheets

(58) Field of Classification Search
CPC .... G05D 1/0238; G05D 1/0246; G05D 1/622; G05D 1/633; B25J 5/00; B25J 9/16; B25J 5/007; B25J 9/1666; B25J 9/1684; G01S 17/89; G06T 17/05
See application file for complete search history.

(56) References Cited

U.S. PATENT DOCUMENTS

| | | | |
|---|---|---|---|
| 8,442,714 | B2 | 5/2013 | Matsukawa et al. |
| 8,924,068 | B2 | 12/2014 | Shitamoto et al. |
| 9,020,682 | B2 | 4/2015 | Shitamoto et al. |
| 9,116,521 | B2 | 8/2015 | Ueda et al. |
| 10,179,406 | B2 | 1/2019 | Dalibard et al. |
| 10,962,647 | B2 | 3/2021 | Shin et al. |
| 11,016,491 | B1 | 5/2021 | Millard |
| 2013/0116880 | A1* | 5/2013 | Shitamoto ............ G05D 1/0223 701/25 |
| 2018/0024564 | A1 | 1/2018 | Matsuda |
| 2021/0114218 | A1 | 4/2021 | Kim et al. |

FOREIGN PATENT DOCUMENTS

| | | |
|---|---|---|
| KR | 10-2005-0024840 A | 3/2005 |
| KR | 10-2005-0108396 A | 11/2005 |
| KR | 10-1476239 B1 | 12/2014 |
| KR | 10-1494224 B1 | 2/2015 |
| KR | 10-2017-0068062 A | 6/2017 |
| KR | 10-2018-0061949 A | 6/2018 |
| KR | 10-2020-0010732 A | 1/2020 |
| KR | 10-2021-0045022 A | 4/2021 |

OTHER PUBLICATIONS

International Search Report (PCT/ISA/210) issued Dec. 16, 2022 by the International Searching Authority in counterpart International Patent Application No. PCT/KR2022/012566.
Written Opinion (PCT/ISA/237) issued Dec. 16, 2022 by the International Searching Authority in counterpart International Patent Application No. PCT/KR2022/012566.
Communication dated Jul. 22, 2024, issued by European Patent Office in European Patent Application No. 22870161.1.
Communication issued Aug. 18, 2025 by the European Patent Office in European Patent Application No. 22870161.1.

* cited by examiner

ELECTRONIC DEVICE AND METHOD FOR CONTROLLING THEREOF

CROSS-REFERENCE TO RELATED APPLICATION(S)

This application is a continuation of International Application No. PCT/KR2022/012566, filed on Aug. 23, 2022, in the Korean Intellectual Property Receiving Office, which is based on and claims priority to Korean Patent Application No. 10-2021-0122732, filed on Sep. 14, 2021, in the Korean Intellectual Property Office, the disclosures of which are incorporated by reference herein in their entireties.

BACKGROUND

Field

This disclosure relates to an electronic device and a controlling method thereof and, more specifically, to an electronic device for providing a traveling method of an electronic device capable of traveling and a controlling method thereof.

Description of the Prior Art

In a related-art, there are technologies that an electronic device travels in an environment where an electronic device such as a robot operates. For example, an electronic device may generate a map corresponding to an environment in which an electronic device operates by using a simultaneous localization and mapping (SLAM) method using a light detection and ranging (LiDAR) sensor and a vision SLAM method using a camera. An electronic device may identify a traveling path directed to a preset destination based on the current position and map of the electronic device, and may travel according to the identified traveling path.

In a conventional traveling method, traveling has been performed based on a map corresponding to an environment in which a pre-stored electronic device operates, so an object that interferes with traveling on the identified traveling path has not been considered. Thus, there has been a need for a technology for providing an appropriate travel path based on there being an object interfering with travelling on the identified travel path.

SUMMARY

The disclosure provides an electronic device for changing an existing traveling path in consideration of an object interfering with traveling of an electronic device, and a controlling method thereof.

A method of controlling an electronic device includes identifying a first traveling path heading to a preset destination based on a map corresponding to an environment in which an electronic device operates; identifying an object interfering with traveling according to the first traveling path based on at least one sensor while traveling according to the first traveling path; identifying an avoidance path to avoid the object based on at least one of a location and speed of the identified object and traveling according to the avoidance path; and based on the identified object being distant by a preset distance or more based on traveling according to the avoidance path, controlling the electronic device to travel according to the first traveling path based on a current location of the electronic device.

The identifying may include obtaining a light detection and ranging (LiDAR) map corresponding to the environment in which the electronic device operates; and identifying the first traveling path based on the LiDAR map and the current location of the electronic device.

The method may further include identifying a first object located in a direction in which the electronic device travels according to the first travelling path based on the at least one sensor; and based on the first object being identified, identifying the avoidance path to avoid the object based on the map and a relative location of the first object and the electronic device and traveling according to the avoidance path.

The traveling according to the avoidance path may include, based on the first object being closer to the electronic device by less than a preset distance, controlling the electronic device to travel to a wall close to the electronic device and stop.

The method may include identifying a type of the first object based on a camera disposed inside the electronic device; and traveling according to the avoidance path by identifying the avoidance path to avoid the object based on the identified type of the first object.

The method may further include, based on the type of the first object being identified as a human, traveling along the first traveling path; and based on identifying that a human is located in a direction in which the electronic device travels while traveling according to the first traveling path, traveling to a wall close to the electronic device and stopping; and based on the human and the electronic device being distant with each other by a preset distance or more after the electronic device stops, controlling the electronic device to travel according to the first traveling path based on a current location of the electronic device.

The method may further include, based on the human being within the preset distance from the electronic device for a preset time or more after the electronic device stops, outputting an audio to travel to a preset destination.

The method may further include, based on identifying that the type of the first object is a robot, identifying a device to travel according to the avoidance path between the electronic device and the robot; based on identifying that the electronic device travels along the avoidance path, traveling according to the avoidance path by identifying the avoidance path to avoid the robot; and based on identifying that the robot travels according to the avoidance path, transmitting a control command to change a traveling path of the robot.

The identifying the object may include identifying a second object located in a direction opposite to a traveling direction of the electronic device based on the at least one sensor; and based on the second object being closer to the electronic device by less than a preset distance, identifying the second object as an object interfering with the traveling.

The method may further include, based on identifying the second object as an object interfering with traveling, traveling along the avoidance path or raising a traveling speed of the electronic device.

According to an embodiment, an electronic device includes a memory storing at least one instruction; a sensor unit comprising at least one sensor; a traveling unit; and a processor configured to control the electronic device by executing at least one instruction stored in the memory, and the processor may identify a first traveling path heading to a preset destination based on a map corresponding to an environment in which an electronic device operates, identify an object interfering with traveling according to the first traveling path based on at least one sensor while traveling according to the first traveling path, identify an avoidance path to avoid the object based on at least one of a location and speed of the identified object and control the travel unit to travel according to the avoidance path, and based on the identified object being distant by a preset distance or more based on traveling according to the avoidance path, control the travel unit to travel according to the first traveling path based on a current location of the electronic device.

The processor may obtain a light detection and ranging (LiDAR) map corresponding to the environment in which the electronic device operates, and identify the first traveling path based on the LiDAR map and the current location of the electronic device.

The processor may identify a first object located in a direction in which the electronic device travels according to the first travelling path based on the at least one sensor, and based on the first object being identified, identify the avoidance path to avoid the object based on the map and a relative location of the first object and the electronic device and control the travel unit to travel according to the avoidance path.

The processor may, based on the first object being closer to the electronic device by less than a preset distance, control the travel unit to travel to a wall close to the electronic device and stop, and based on the first object being distant from the electronic device by a preset distance or more after the electronic device stops, control the travel unit to travel according to the first traveling path based on a current location of the electronic device.

The at least one sensor may include a camera, and the processor may identify a type of the first object based on the camera, and control the travel unit to travel along an avoidance path by identifying the avoidance path based on the identified type of the first object.

The processor may, based on the type of the first object being identified as a human, control the travel unit to travel along the first traveling path; and based on identifying that a human is located in a direction in which the electronic device travels while traveling according to the first traveling path, control the travel unit to travel to a wall close to the electronic device and stop; and based on the human and the electronic device being distant with each other by a preset distance or more after the electronic device stops, control the travel unit to travel according to the first traveling path based on a current location of the electronic device.

The electronic device may further include an input/output interface to output audio and the processor may, based on the human being within the preset distance from the electronic device for a preset time or more after the electronic device stops, control the input/output interface to output an audio to travel to a preset destination.

The electronic device may further include a communicator and may, based on identifying that the type of the first object is a robot, identify a device to travel according to the avoidance path between the electronic device and the robot; based on identifying that the electronic device travels along the avoidance path, control the travel unit to travel according to the avoidance path by identifying the avoidance path to avoid the robot; and based on identifying that the robot travels according to the avoidance path, may control the communicator to transmit a control command to change a traveling path of the robot to the robot.

The processor may identify a second object located in a direction opposite to a traveling direction of the electronic device based on the at least one sensor; and based on the second object being closer to the electronic device by less than a preset distance, may identify the second object as an object interfering with the traveling.

The processor may, based on identifying the second object as an object interfering with traveling, control the travel unit to travel along the avoidance path or raising a traveling speed of the electronic device.

According to various embodiments as described above, an electronic device may travel according to an appropriate traveling path in consideration of an object that interferes with traveling.

DETAILED DESCRIPTION

The disclosure will be described in greater detail with reference to the drawings.

Figure 1:
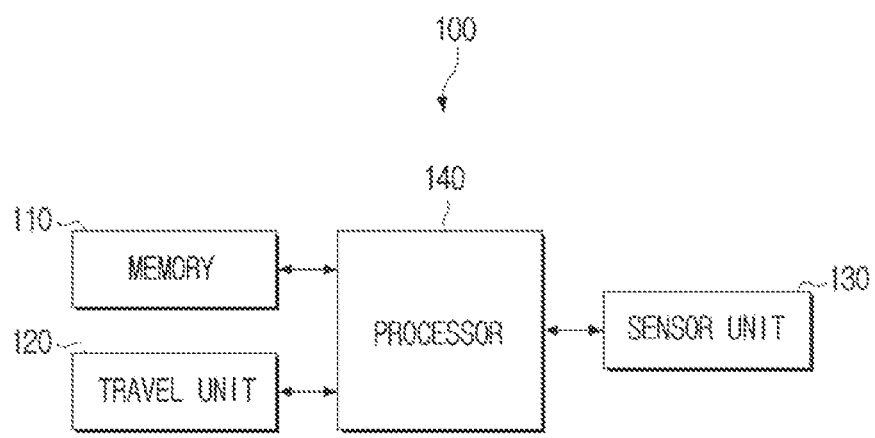
FIG. 1 is a block diagram illustrating a configuration of an electronic device according to an embodiment of the disclosure.

FIG. 1 is a block diagram illustrating a configuration of an electronic device according to an embodiment of the disclosure.

Referring to FIG. 1, an electronic device 100 may include a memory 110, a traveling unit 120, a sensor unit 130, and a processor 140. The configuration shown in FIG. 1 is an example for implementing one embodiment of the disclosure, and any suitable hardware and software configurations that would be obvious to a person skilled in the art may be further included in the electronic device 100.

The memory 110 may store an instruction or data related to at least one different element of the electronic device 100. The instruction is one action statement for the processor 140 in a programming language, and a minimum unit of a program that may be directly performed by the processor 140. For example, the memory 110 may be a non-volatile memory, a volatile memory, a flash memory, a hard disk drive (HDD), or a solid state drive (SSD). The memory 110 may be accessed by the processor 140, and read/write/modify/update data by the processor 140 may be performed. The term memory in the disclosure may include the memory 110, the read-only memory (ROM), random access memory (RAM) in the processor 140, or a memory card (e.g., micro secure digital (SD) card, memory stick) mounted to the electronic device 100. The memory 110 may store programs and data for configuring various screens to be displayed on a display area of the display 160.

The memory 110 may store a map corresponding to an environment in which the electronic device operates. A map corresponding to an environment in which the electronic device stored in the memory 110 operates may be updated and stored in the memory 110 through a light detection and ranging (LiDAR) sensor included in the sensor unit 130.

The traveling unit 120 may move the electronic device 100 by the control of the processor 140, and may include a motor and a plurality of wheels. The traveling unit 120 may control the moving direction and the moving speed of the electronic device 100 according to a predetermined traveling path by the control of the processor 140.

The sensor unit 130 may obtain a plurality of information necessary for the electronic device 100 to travel.

For example, the sensor unit 130 may include a LiDAR sensor. The LiDAR sensor is a sensor capable of obtaining information about physical characteristics (the location and direction of the electronic device 100, distance between the electronic device 100 and the target object, the direction, shape of the target object, the moving speed, etc.) associated with the target object using a time from the launch of laser pulse to returning of laser pulse scattered or reflected from the target device, the intensity, frequency, and change in a polarization state of the scattered or reflected laser. The electronic device 100 may obtain a map corresponding to an environment in which the electronic device operates by scanning the periphery of the electronic device 100 using a LiDAR sensor. As an example, the map corresponding to the environment in which the electronic device operates is a map that may be obtained using information on the physical characteristics of the electronic device obtained using the laser pulse of the LiDAR sensor. The electronic device 100 may perform simultaneous localization and mapping (SLAM) using the LiDAR sensor to obtain information on the location of the electronic device 100 in a map corresponding to the environment in which the electronic device operates. The SLAM is a technology for estimating a map and a current location of the space with respect to an electronic device capable of searching the periphery while moving an arbitrary space. The disclosure is not limited thereto, and it is also possible to obtain a map corresponding to an environment in which the electronic device operates through various sensors in addition to the LiDAR sensor.

For example, the sensor unit 130 may include a camera. The camera may photograph an environment in which the electronic device 100 operates while the electronic device 100 is traveling. The electronic device 100 may obtain an image obtained by capturing an object that interferes with traveling according to a traveling path on which the electronic device travels, through a camera. In one embodiment, the camera may be implemented as a camera for obtaining a general image, but the disclosure is not limited thereto, and may be implemented as a depth camera capable of further obtaining depth information between the electronic device 100 and the object. The processor 140 may obtain distance information between the electronic device 100 and the object using the depth camera. In one embodiment, the processor 140 may identify the type of the object through an image obtained by capturing an object that interferes with the traveling that is obtained through the camera.

For example, the sensor unit 130 may include a distance sensor. The distance sensor is configured to obtain distance information between the electronic device 100 and the object and the distance sensor may be implemented with an infrared ray sensor, an ultrasonic sensor, a radio frequency (RF) sensor, or the like.

In the example above, the sensor unit 130 includes at least one of the LiDAR sensor, camera, and distance sensor, but the disclosure is not limited thereto. The sensor unit 130 may include various sensors (e.g., a wall detection sensor, a collision detection sensor, a geomagnetic sensor, or the like) capable of obtaining information necessary for traveling.

The processor 140 may include one or more among a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. The processor 140 may be implemented in a system on chip (SoC) type or a large scale integration (LSI) type which a processing algorithm is implemented therein or in a field programmable gate array (FPGA). The processor 140 may perform various functions by executing computer executable instructions stored in the memory 110.

The processor 140 may be electrically connected to the memory 110 to control the overall operation and function of the electronic device 100. The processor 140 may identify a first traveling path directed to a preset destination based on a map corresponding to an environment in which the electronic device operates. As an example, the map corresponding to the environment in which the electronic device operates may be obtained based on the LiDAR sensor of the sensor unit 130. The processor 140 may obtain a map corresponding to the environment in which the electronic device 100 operates through the LiDAR sensor of the sensor unit 130. The processor 140 may identify a first traveling path directed to a predetermined destination based on a map corresponding to an environment in which the electronic device operates and a current location of the electronic device 100.

Figure 2:
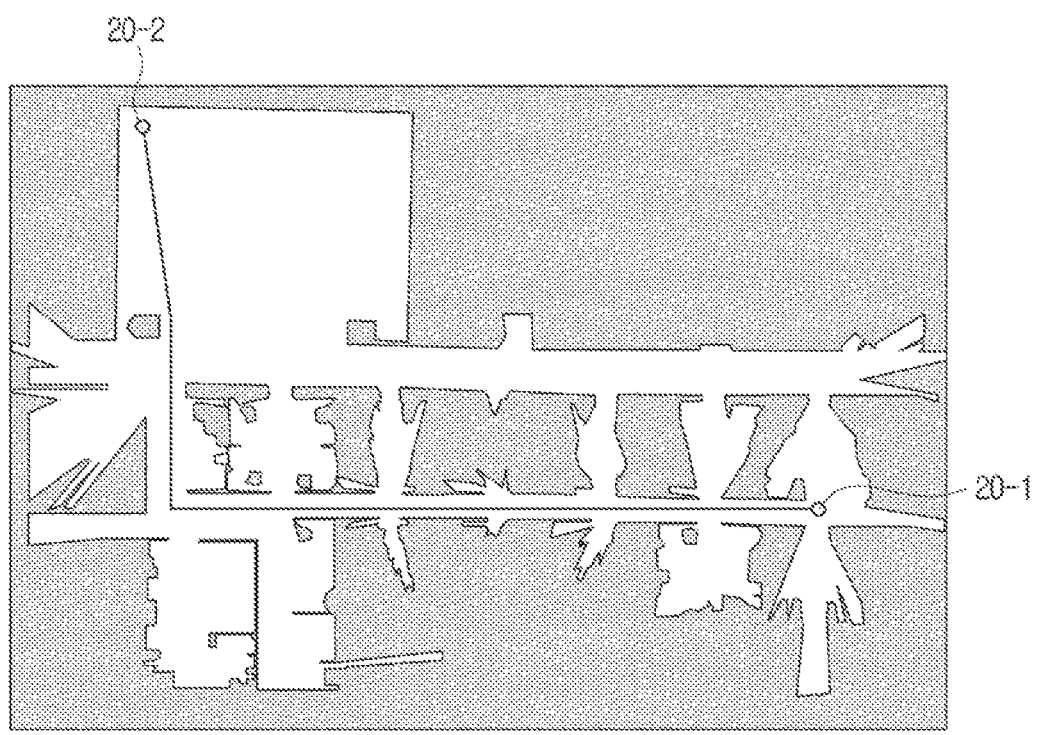
FIG. 2 is a diagram illustrating an embodiment of identifying a traveling path to head to a preset destination based on a map corresponding to an environment in which an electronic device operates.

FIG. 2 is a diagram illustrating an embodiment of an electronic device identifying a traveling path directed to a predetermined destination on a map corresponding to an environment in which the electronic device operates. Referring to FIG. 2, the processor 140 may identify a first traveling path on a map corresponding to an environment in which the electronic device operates based on a location 20-2 corresponding to a predetermined destination on a map corresponding to an environment in which the electronic device operates and a current location 20-1 of the electronic device 100 on a map corresponding to an environment in which the electronic device operates. Based on the first traveling path being identified, the processor 140 may control the traveling unit 120 so that the electronic device 100 travels in accordance with the first traveling path.

During traveling of the electronic device 100 in accordance with the first traveling path, the processor 140 may identify an object that interferes with traveling according to the first traveling path based on at least one sensor included in the sensor unit 130. The at least one sensor may include various sensors such as a LiDAR sensor, a camera, a depth camera, a wall detection sensor, a collision detection sensor, a geomagnetic sensor, or the like.

The processor 140 may identify an avoidance path to avoid the object based on at least one of a location and speed of the identified object and control the travel unit 120 to travel according to the avoidance path.

According to an embodiment, the processor 140 may identify a first object located in a direction in which the electronic device 100 travels according to the first travelling path based on the at least one sensor. Based on the first object being identified, the processor 140 may identify the avoidance path to avoid the object based on the map and a relative location of the first object and the electronic device and may control the travel unit 120 to travel according to the avoidance path. The processor 140 may control the traveling unit 120 to travel according to the first traveling path based on the current location of the electronic device 100 based on traveling on the first traveling path being available.

For example, the processor 140 may identify whether the first object identified through at least one sensor of the sensor unit 130 gets closer to the electronic device 100 by less than a preset distance (e.g., 1 m). Based on the first object being closer to the electronic device 100 by less than a preset distance, control the travel unit 120 so that the electronic device 100 travels to a close wall and stops. Based on the first object being distant from the electronic device 100 by a preset distance or more after the electronic device 100 stops, the processor 140 may control the travel unit 120 to travel according to the first traveling path based on a current location of the electronic device 100.

For example, based on the first object approaches being less than the predetermined distance from the electronic device 100, the electronic device 100 travels to a close wall and stops, but the embodiment is not limited thereto. The processor 140 may control the traveling unit 120 to perform various traveling to avoid the first object, which will be described later with reference to FIG. 5B.

During traveling according to the first traveling path, the processor 140 may identify the type of the first object based on the camera of the sensor unit 130. The processor 140 may identify an avoidance path for avoiding an object based on the type of the first object and control the traveling unit 120 to travel along the avoidance path. The processor 140 may perform image recognition on the image capturing the first object obtained through the camera to identify the type of the first object.

According to an embodiment, the processor 140 may control the traveling unit 120 to keep traveling along a first traveling path based on identification that a type of the first object is a human. Based on the identification that a human is positioned in a direction of traveling of the electronic device, the processor 140 may control the traveling unit 120 to travel to a wall adjacent to the electronic device 100 and stop. For example, the processor 140, based on the identification that a human is located within a predetermined distance (e.g., 1 m) from the electronic device 100, the processor 140 may control the traveling unit 120 to travel to a wall adjacent to the electronic device 100 and stop. After the electronic device 100 stops, based on the electronic device 100 being distant from the human by a preset distance or more, the processor 140 may control the traveling unit 120 so as to travel along the first traveling path based on the current location of the electronic device 100.

As an embodiment, based on the type of the first object being a human, the processor 140 may control input/output interface to output audio to travel to a preset destination. The input/output interface is configured to output audio, which will be described in detail in FIG. 11. For example, based on a human being within the preset distance (e.g., 1 m) from the electronic device 100 for greater than or equal to a preset time (e.g., five seconds) after the electronic device 100 stops, the processor 140 may control the input/output interface to output audio to travel to the preset destination. The audio to travel to the preset destination may be audio requesting a human to step aside, for example, "please pass the way", "please step aside," "I've to go to a living room. Please step aside," or the like.

In one embodiment, the processor 140 may identify a traveling device along an avoidance path of the electronic device 100 and the robot, based on the type of the first object being identified to be a robot. As an example, the processor 140 may identify a device which is located closer to the wall out of the electronic device 100 and the robot as a device to travel along the avoidance path. For example, the processor 140 may identify a device that identifies a counterpart device first between the electronic device 100 and the robot as the device to travel in accordance with an avoidance path. However, the disclosure is not limited thereto, and a device to travel may be identified by various methods according to an avoidance path between the electronic device 100 and the robot.

Based on the electronic device 100 being identified as traveling along the avoidance path, the processor 140 may identify the avoidance path to avoid the robot and may control the traveling unit 120 to travel along the avoidance path. Based on the robot being identified to travel along the avoidance path, the processor 140 may transmit a control command to the robot to change the traveling path of the robot. Based on the robot travels along the avoidance path by identifying the avoidance path to avoid the electronic device 100 according to the control command, the processor 140 may continue to control the traveling unit 120 to keep traveling through the first traveling path.

According to an embodiment, the processor 140 may identify a second object located in a direction opposite to a direction in which the electronic device 100 travels according to a first traveling path based on at least one sensor. Once the second object is identified, the processor 140 may identify the second object as an object interfering with traveling based on the second object being closer to the electronic device 100 (e.g., 1 m). Based on the speed of the second object being faster than the traveling speed of the electronic device 100, the processor 140 may identify the second object as an object interfering with traveling. Based on the second object being identified as an object interfering with traveling, the processor 140 may control the traveling unit 120 to travel according to the avoidance path or increase the traveling speed of the electronic device 100. A specific embodiment of the second object located in a direction opposite to the direction in of traveling along the first traveling path of the electronic device 100 will be described through FIGS. 6B and 6C.

Figure 3:
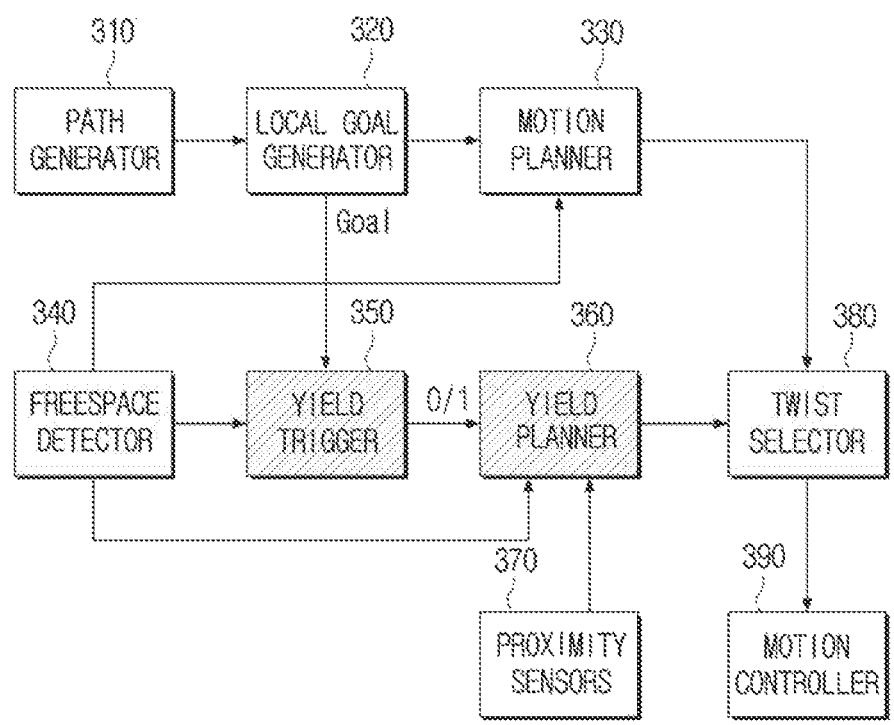
FIG. 3 is a diagram illustrating a detailed traveling operation of an electronic device according to an embodiment of the disclosure.

FIG. 3 is a diagram illustrating a detailed traveling operation of an electronic device according to an embodiment of the disclosure.

Referring to FIG. 3, the electronic device 100 may perform traveling by using a plurality of modules 310 to 390.

A path generator module 310 may identify a first traveling path through which the electronic device 100 is directed to a preset destination. For example, the path generator module 310 may identify a first traveling path directed to a predetermined destination based on a map corresponding to an environment in which the electronic device 100 operates and a position of the current electronic device 100. A preset destination on a map corresponding to an environment in which the electronic device operates may be global goal. As an example, a plurality of point clouds (PC) may be included in the first traveling path which connects the current location of the electronic device 100 on a map corresponding to the environment in which the electronic device operates to the location of the preset destination.

The local goal generator module 320 may identify a local goal that causes the electronic device 100 to travel in accordance with the first travel path. The local goal generator module 320 may identify a local goal that allows the electronic device 100 to travel along the first travel path using a current position of the electronic device 100 and a plurality of point clouds on the first traveling path. For example, the local goal generator module 320 may identify a point cloud that is ahead of a point cloud that is closest to the current location of the electronic device 100 among the plurality of point clouds on the first traveling path as the local goal. The point cloud on the first traveling path on which the electronic device 100 should be moved according to the local goal generator module 320 in the current position of the electronic device 100 may be local goal, and the local goal may continue to change while the electronic device 100 is traveling, so that the electronic device 100 may travel to the global goal.

The motion planner module 330 may identify the speed (e.g., linear velocity and angular velocity) of the electronic device 100 so that the electronic device 100 is traveling to the local goal. By controlling the speed (e.g., the linear velocity and angular velocity) of the electronic device 100 using the motion planner module 330, the electronic device 100 may travel to the local goal. The motion planner module 330 may obtain information of an object around the current location of the electronic device 100 from a freespace detector module 340. Based on the information of the surrounding object obtained from the freespace detector module 340, the motion planner module 330 may identify the speed of the electronic device 100 to allow the electronic device 100 to move to the local goal through an appropriate path. A twist selector module 380 may transmit a control command for causing the electronic device 100 to travel according to the speed identified in the motion planner module 330 to a motion controller module 390, and the motion controller module 390 may control the traveling unit 120 to travel the electronic device 100 at a speed corresponding to the control command.

According to the disclosure, a yield trigger module 350 may identify whether the electronic device 100 may travel to a local goal. The yield trigger module 350 may identify whether the electronic device 100 may travel to the local goal based on the object sensed by the freespace detector module 340. The yield trigger module 350 may identify whether the object sensed by the freespace detector module 340 interferes with traveling the electronic device 100 to the local goal. As an example, based on the electronic device 100 being identified as being unable to travel to a local goal due to the object sensed by the freespace detector module 340, the yield trigger module 350 may identify that the corresponding object interferes with travelling to a local goal.

Based on the electronic device 100 being identified as being able to travel to a local goal, the yield trigger module 350 may transmit the yield trigger information (0) indicating that the electronic device is able to travel to the local goal. The twist selector module 380 may transmit a control command for causing the electronic device 100 to travel according to the speed identified in the motion planner module 330 to the motion controller module 390, and the motion controller module 390 may control the traveling unit 120 to drive the electronic device 100 at a speed corresponding to the control command.

Based on the electronic device 100 being identified as not being able to travel to the local goal, the yield trigger module 350 may transmit to the yield planner module 360 the yield trigger information 1 indicating that the electronic device may not travel to the local goal. The yield planner module 360 may obtain information about an object around the electronic device 100 from a proximity sensor module 370. The information on the object may include distance information between the object and the electronic device 100, and may further include various information such as information on the speed of the information object with respect to the type of the object.

The proximity sensor module 370 may obtain information about an object around the electronic device 100 using at least one of a LiDAR sensor, a camera, a depth camera, a wall detection sensor, a collision detection sensor, and a geomagnetic sensor. The embodiment is not limited thereto and the proximity sensor module 370 may use various sensors to obtain information about an object around the electronic device 100. Based on the information on the object, the yield planner module 360 may identify the speed (e.g., linear velocity and angular velocity) of the electronic device 100 to travel in accordance with the avoidance path. The twist selector module 380 may transmit a control command to travel the electronic device according to the speed identified by the yield planner module 360 to the motion controller module 390, and the motion controller module 390 may control the traveling unit 120 to drive the electronic device 100 at a speed corresponding to the control command. The yield planner module 360 may identify the speed of the electronic device for traveling by avoiding the object. An embodiment of traveling by avoiding the object may include an embodiment in which the electronic device 100 travels to the wall close to the electronic device 100 and then stops to allow an object to pass. An embodiment in which an object travels to avoid an object may include an embodiment of identifying a standby space around the electronic device 100 and traveling to the identified standby space to allow an object to pass. The embodiment in which the object travels by avoiding an object is not limited to the above-described embodiment, and various embodiments will be described with reference to the following figures.

Figure 4A:
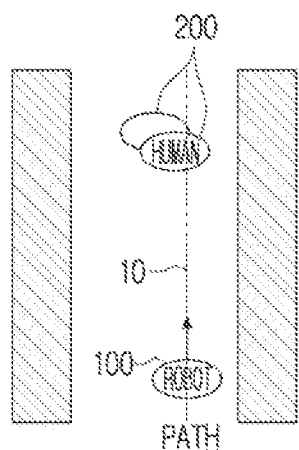
FIG. 4A is a diagram illustrating an embodiment in which an object interfering with traveling is located in a direction in which the electronic device travels according to an embodiment of the disclosure.
Figure 4B:
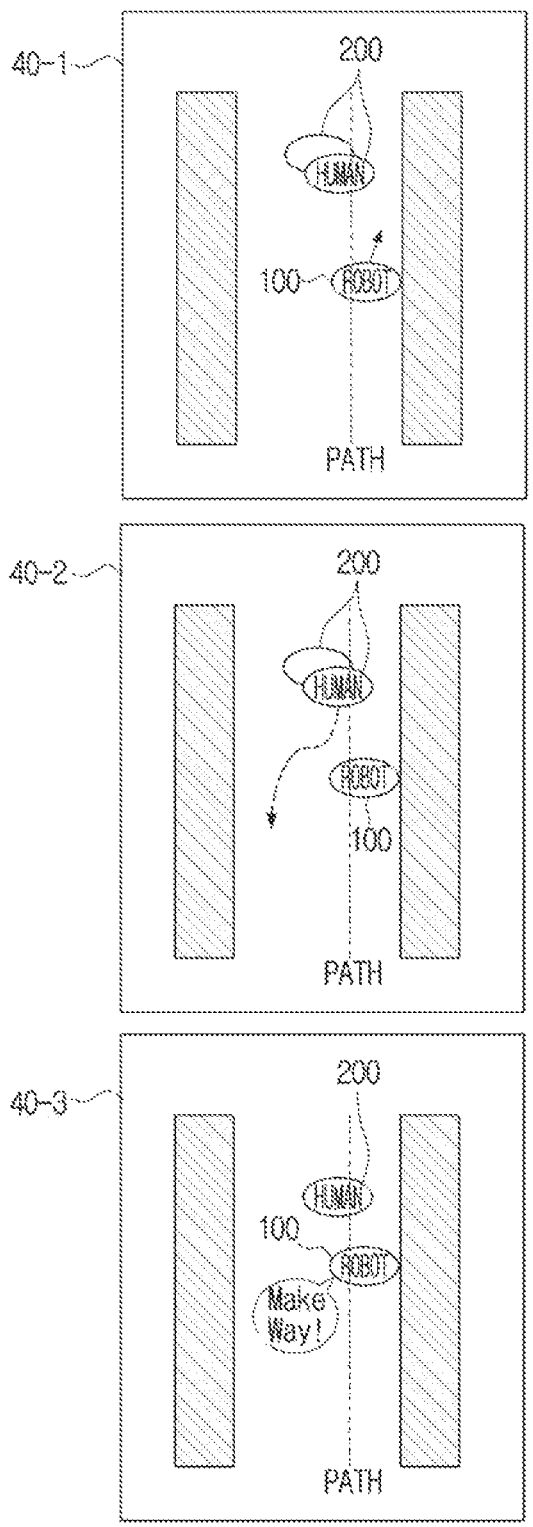
FIG. 4B is a diagram illustrating an embodiment in which an electronic device changes a traveling path according to an object interfering with traveling according to an embodiment of the disclosure.

FIG. 4A is a diagram illustrating an embodiment in which an object interfering with traveling is located in a direction in which the electronic device travels according to an embodiment of the disclosure. FIG. 4B is a diagram illustrating an embodiment in which an electronic device changes a traveling path according to an object interfering with traveling according to an embodiment of the disclosure.

Referring to FIG. 4A, the electronic device 100 may identify an object which impedes traveling based on at least one sensor while traveling along the first traveling path 10 heading to the preset destination.

According to an embodiment, the electronic device 100 may identify the first object 200 located in a direction in which the electronic device 100 travels according to a first traveling path 10 as an object that interferes with the traveling, based on at least one sensor. FIG. 4A illustrates that the first object 200 is a human or a robot.

According to an embodiment, based on the identification that traveling to a preset destination is not possible due to the first object 200, the electronic device 100 may identify the first object 200 as an object that interferes with traveling. Based on the first object 200 being located at a narrow passage as illustrated in FIG. 4A, the electronic device 100 may not travel along the first traveling path 10 and thus the electronic device 100 may identify the first object 200 as an object which interferes with traveling.

Based on the first object 200 which interferes with traveling being identified, the electronic device 100 may travel to a wall close to the electronic device 100 and may stop according to a first embodiment 40-1 of FIG. 4B.

Based on the first object 200 deviates from the traveling path 10 according to a second embodiment 40-2 of FIG. 4B, the electronic device 100 may control the electronic device 100 to travel according to the first traveling path based on a current position.

In the case where the first object 100 is identified as a human, the electronic device 100 moves to a close wall and stops according to the first embodiment 40-1 of FIG. 4B, but the first object 100 does not move for a preset time (e.g., five seconds) or more, the electronic device 100 may output audio for traveling to a predetermined destination, such as a third embodiment 40-3 of FIG. 4B. The audio for traveling to a preset destination may be audio requesting a human to step aside, and may include various audio such as "please pass the way", "please step aside", "I have to move to a living room. Please step aside" or the like.

Figure 5A:
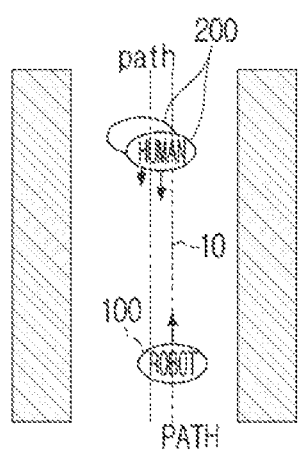
FIG. 5A is a diagram illustrating an embodiment in which an object located in a direction in which an electronic device travels gets closer to an electronic device according to an embodiment of the disclosure.
Figure 5B:
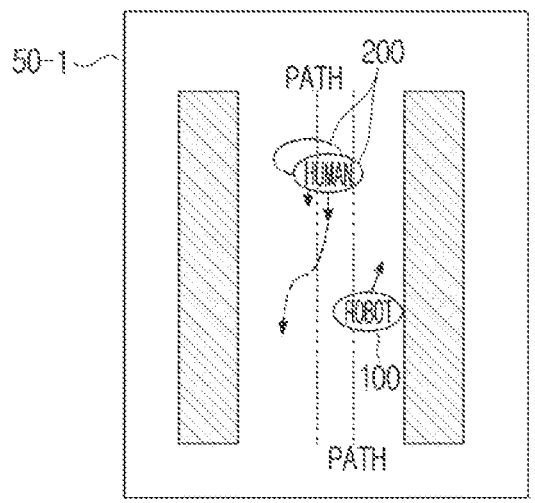
FIG. 5B is a diagram illustrating an embodiment in which an electronic device changes a traveling path according to an object interfering with traveling according to an embodiment of the disclosure.
Figure 5B:
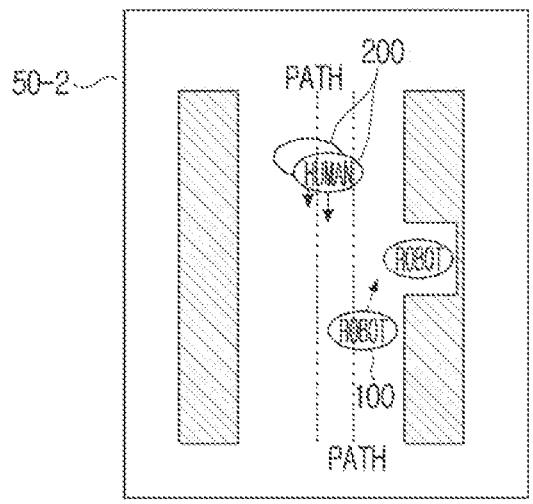
Figure 5B:
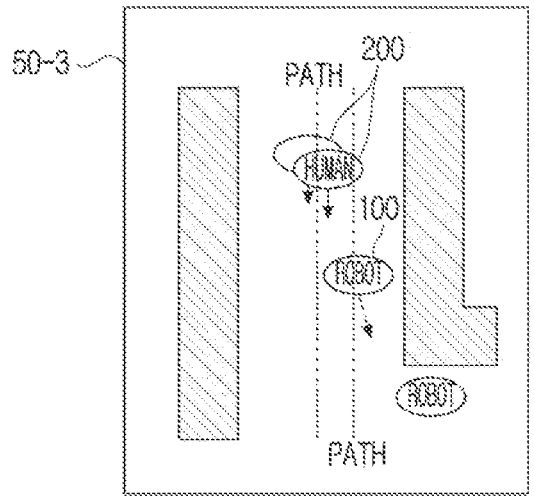

FIG. 5A is a diagram illustrating an embodiment in which an object located in a direction in which an electronic device travels gets closer to an electronic device according to an embodiment of the disclosure. FIG. 5B is a diagram illustrating an embodiment in which an electronic device changes a traveling path according to an object interfering with traveling according to an embodiment of the disclosure.

The electronic device 100 may identify an object interfering with traveling based on at least one sensor while traveling along the first traveling path 10 directed to a preset destination.

Referring to FIG. 5A, based on the identification that the first object 200 that is located in a direction of traveling of the electronic device 100 along the first traveling path 10 is moving toward the electronic device 100 based on at least one sensor, the electronic device 100 may identify the first object 200 as an object interfering with traveling. FIG. 5A illustrates that the first object 200 is a human or a robot. The embodiment is not limited thereto, and based on the electronic device 100 being identified as being unable to travel to a predetermined destination due to the first object 200, the electronic device 100 may identify the first object 200 as an object interfering with traveling. Based on the first object 200 being located in a narrow passage as shown in FIG. 5A, the electronic device 100 may not travel according to the first traveling path 10, and thus the electronic device 100 may identify the first object 200 as an object interfering with traveling.

According to an embodiment, based on the first object 200 interfering with the traveling being identified, the electronic device 100 may travel to the wall close to the electronic device 100 and stop traveling according to a first embodiment 50-1 of FIG. 5B. As an example, the electronic device 100 may identify a wall close to the electronic device 100 based on at least one sensor. For example, the electronic device 100 may identify a wall close to the electronic device 100 using at least one of a LiDAR sensor, a depth camera, and a wall detection sensor. The electronic device 100 may control the electronic device 100 to travel along the first traveling path based on the current position after the electronic device 100 travels to a close wall and stops for a predetermined time (e.g., five seconds).

According to an embodiment, based on the first object 200 interfering with traveling being identified, the electronic device 100 may travel to a standby space located in a direction in which the electronic device 100 may travel according to the second embodiment 50-2 of FIG. 5B and stop. For example, the electronic device 100 may identify a standby space located in direction to which the electronic device 100 moves, based on at least one sensor. For example, the electronic device 100 may identify the electronic device 100 and the standby space using at least one of a LiDAR sensor, a depth camera, or a wall detection sensor. However, the electronic device 100 may identify at least one standby space on the map corresponding to the environment in which the electronic device operates, and may identify a standby space located in a direction in which the electronic device 100 moves among the at least one identified standby space. The standby space located in the moving direction of the electronic device 100 may refer to a standby space to which the electronic device 100 may move without the influence of the first object 200 in consideration of the position of the first object 200. The electronic device 100 may control the electronic device 100 to travel along the first traveling path based on the current position after traveling to the identified standby space and stopping for a preset time (e.g., five seconds).

For example, based on the standby space being located in the direction where the electronic device 100 moves is not present, the electronic device 100 may travel to the standby space located in a direction opposite to the direction of moving of the electronic device 100 and may stop traveling according to a third embodiment 50-3 of FIG. 5B. As an example, the electronic device 100 may identify a standby space located in a direction opposite to a direction in which the electronic device 100 moves based on at least one sensor. For example, the electronic device 100 may identify a standby space located in a direction opposite to a direction in which the electronic device 100 moves using at least one of a LiDAR sensor, a depth camera, or a wall detection sensor. The embodiment is not limited thereto and the electronic device 100 may identify at least one standby space on a map corresponding to an environment in which the electronic device operates, and may identify the nearest standby space among the at least one identified standby space located in the direction opposite to the direction in which the electronic device 100 moves. The standby place located in a direction opposite to the direction of moving of the electronic device 100 may refer to the standby space in which a space through which the first object 200 may pass, based on the electronic device 100 moves to the corresponding standby space.

The electronic device may travel to the identified standby space and stop for a preset time (e.g., five seconds) and may travel along the first travel path based on the current position.

Figure 6A:
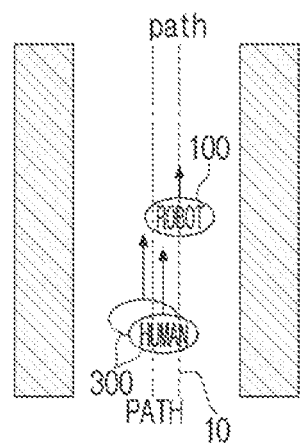
FIG. 6A is a diagram illustrating an embodiment in which an object interfering with traveling is located in a direction opposite to the direction in which the electronic device travels according to an embodiment of the disclosure.
Figure 6B:
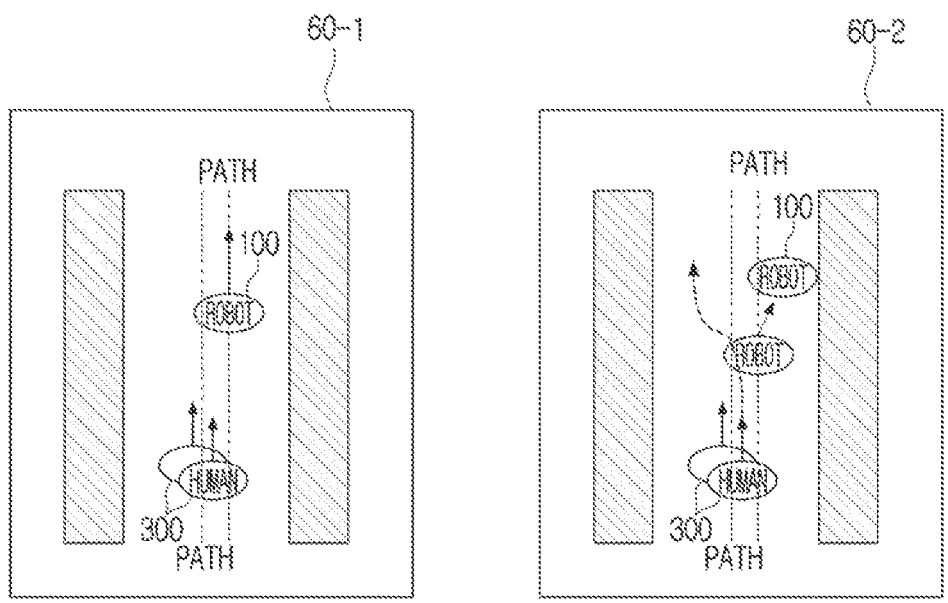
FIG. 6B is a diagram illustrating an embodiment of changing traveling speed or traveling path according to an object interfering with traveling according to an embodiment of the disclosure.
Figure 6C:
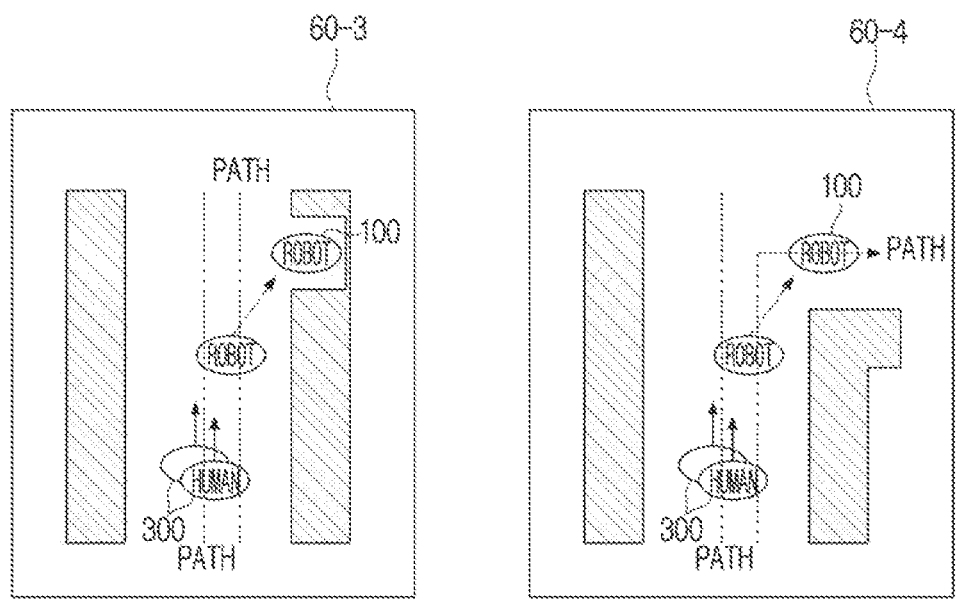
FIG. 6C is a diagram illustrating an embodiment of changing traveling speed or traveling path according to an object interfering with traveling according to an embodiment of the disclosure.

FIG. 6A is a diagram illustrating an embodiment in which an object interfering with traveling is located in a direction opposite to the direction in which the electronic device travels according to an embodiment of the disclosure. FIG. 6B is a diagram illustrating an embodiment of changing traveling speed or traveling path according to an object interfering with traveling according to an embodiment of the disclosure. FIG. 6C is a diagram illustrating an embodiment of changing traveling speed or traveling path according to an object interfering with traveling according to an embodiment of the disclosure.

Referring to FIG. 6A, the electronic device 100, while traveling along the first traveling path 10 heading to a preset destination, the electronic device 100 may identify a second object 300 located in a direction opposite to the direction of moving of the electronic device 100 based on at least one sensor. Based on the speed of the second object 300 being faster than the traveling speed of the electronic device 100, and the electronic device 100 and the second object 300 keep being closer, the electronic device 100 may identify the second object 300 as an object interfering with traveling. The embodiment is not limited thereto, and based on the identification that the electronic device 100 keeps being closer and the current traveling space of the electronic device 100 is narrow, the electronic device 100 may identify the second object 300 as an object interfering with traveling.

According to an embodiment, based on the second object 300 being identified as an object interfering with traveling, the electronic device 100 may increase traveling speed of the electronic device 100 according to a first embodiment 60-1 of FIG. 6B. For example, based on at least one sensor, the electronic device 100 may identify the relative speed of the second object 300 and the electronic device 100 and may identify speed of the second objet 300 based on the identified relative speed and the current speed of the electronic device 100. The embodiment is not limited thereto and the electronic device 100 may identify the speed of the second object 300 by various methods. Based on the speed of the second object 300 being identified, the electronic device 100 may travel according to the first traveling path at a speed higher than the identified speed of the second object 300.

According to an embodiment, based on the second object 300 being identified as the object interfering with traveling, the electronic device 100 may travel to the wall close to the electronic device 100 and stop according to a second embodiment 60-2 of FIG. 6B. As an example, the electronic device 100 may identify a wall close to the electronic device 100. For example, the electronic device 100 may identify a wall close to the electronic device 100 using at least one of the LiDAR sensor, depth camera, or wall detection sensor. The electronic device 100 may drive to the close wall and stop for a preset time (e.g., five seconds) and may travel according to the first travel path based on the current location.

According to an embodiment, based on the second object 300 being identified as an object interfering with traveling, the electronic device 100 may travel to a standby space located in a direction in which the electronic device 100 and stop according to the third embodiment 60-3 of FIG. 6C. For example, the electronic device 100 may identify a standby space which is located in a direction in which the electronic device 100 moves based on at least one sensor. For example, the electronic device 100 may identify the electronic device 100 and the standby space using at least one of a LiDAR sensor, a depth camera, or a wall detection sensor. However, the electronic device 100 may identify at least one standby space on a map corresponding to an environment in which the electronic device operates, and identify a standby space located in a direction in which the electronic device 100 moves among the identified at least one standby space. The standby space located in the moving direction of the electronic device 100 may refer to a standby space in which the electronic device 100 may move without the influence of the second object 300 in consideration of the position of the second object 300. The electronic device 100 may travel to the identified standby space and stop for a predetermined time (e.g., five seconds), and then may travel along the first traveling path based on the current position.

According to an embodiment, based on the electronic device 100 continuously moves according to the first traveling path, such as the fourth embodiment 50-4 of FIG. 6C, even though there is no standby space located in a direction of moving the electronic device 100, based on a surplus space being secured, the electronic device may travel along the first traveling path by increasing the traveling speed. However, the embodiment is not limited thereto, and in consideration of the relative speed between the electronic device 100 and the second object 300, based on the second object 300 being identified as being able to travel without collision with the second object 300, the electronic device 100 may travel at an existing speed in accordance with the first traveling path.

Figure 7:
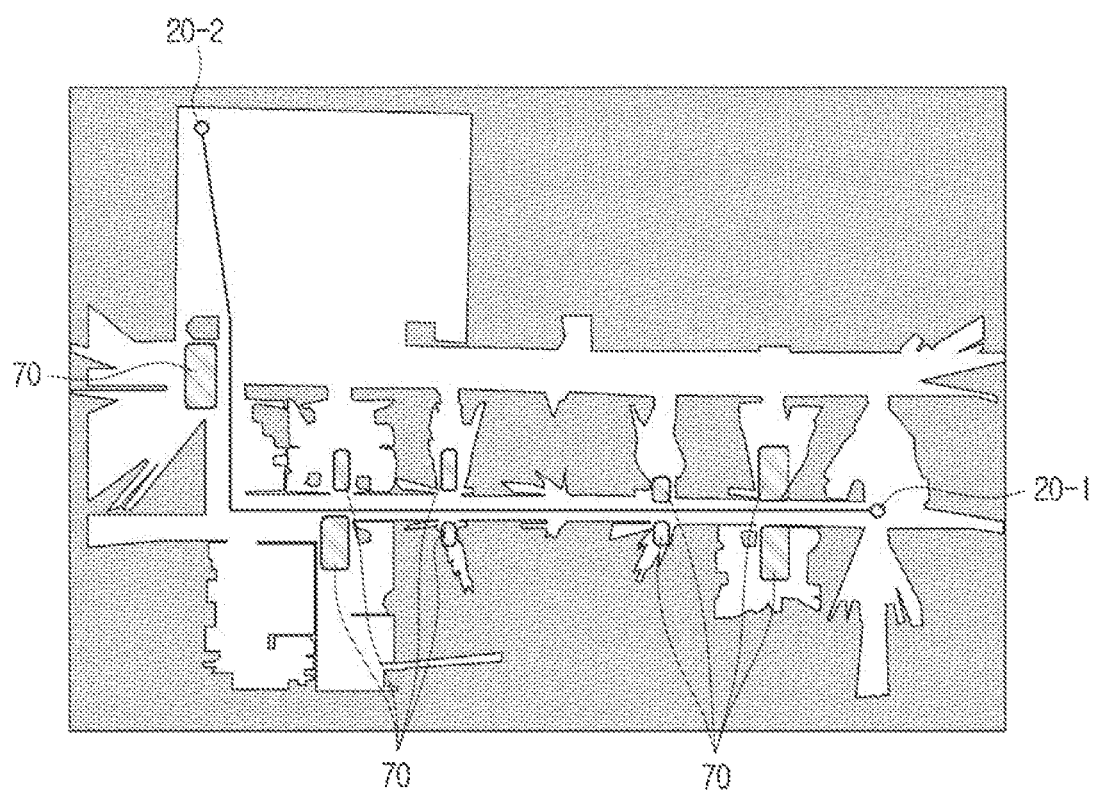
FIG. 7 is a diagram illustrating a standby space on a map corresponding to an environment in which an electronic device operates according to an embodiment of the disclosure.

FIG. 7 is a diagram illustrating a standby space on a map corresponding to an environment in which an electronic device operates according to an embodiment of the disclosure.

According to the disclosure, the electronic device 100 may identify a first traveling path for traveling from a current location 20-1 of the electronic device 100 to a location 20-2 corresponding to a preset destination, based on a map corresponding to an environment in which the electronic device operates. As an example, the electronic device 100 may obtain a map corresponding to an environment in which the electronic device operates by using the LiDAR sensor while traveling the environment in which the electronic device 100 operates. The embodiment is not limited thereto, and the electronic device 100 may obtain a map corresponding to an environment in which the electronic device 100 operates through an external server.

The electronic device 100 may identify a plurality of standby spaces 70 located around the first traveling path based on a map corresponding to an environment in which the electronic device operates. The plurality of standby spaces 70 may mean a space in which the electronic device 100 may move and stop based on a passage being narrow.

Based on an object interfering with traveling according to the first traveling path being identified according to the embodiments described above, the electronic device 100 may identify an avoidance path based on the current position of the electronic device 100 and the plurality of standby spaces 70, and then control the electronic device 100 to travel in accordance with the first traveling path to reach a predetermined destination.

Figure 8:
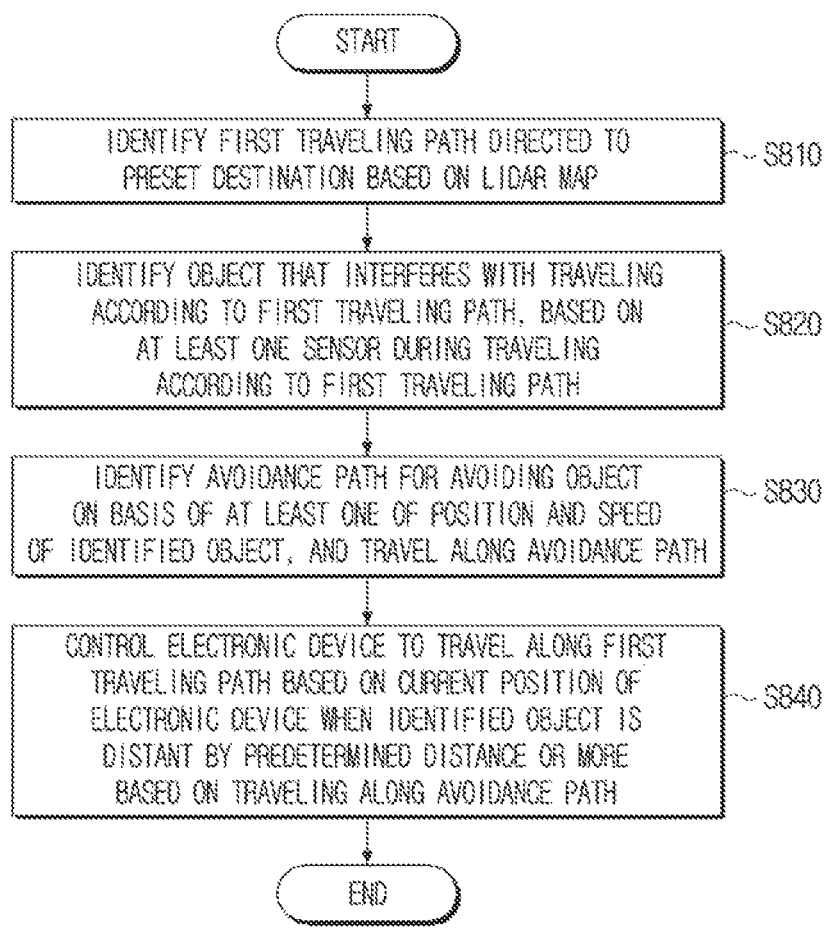
FIG. 8 is a flowchart illustrating a method for controlling an electronic device according to an embodiment of the disclosure.

FIG. 8 is a flowchart illustrating a method for controlling an electronic device according to an embodiment of the disclosure.

Referring to FIG. 8, the electronic device 100 may identify a first traveling path directed to a preset destination based on a map corresponding to an environment in which the electronic device operates in operation S810. In one embodiment, the electronic device 100 may identify a first traveling path based on a location of a current electronic device 100 on a map corresponding to an environment in which the electronic device operates and a location of a predetermined destination on a map corresponding to an environment in which the electronic device operates. The embodiment is not limited thereto and the first traveling path may be identified by various methods.

In operation S820, the electronic device 100 may identify an object that interferes with traveling according to the first traveling path, based on the at least one sensor during traveling according to the first traveling path. In one embodiment, the electronic device 100 may identify, based on at least one sensor, a first object located in a direction in which the electronic device 100 travels in accordance with a first traveling path, as an interfering object. According to an embodiment, the electronic device 100 may identify a second object as an object interfering with traveling based on the second object located in a direction opposite to the traveling direction of the electronic device 100 being closer to less than a predetermined distance.

The electronic device 100 may identify an avoidance path for avoiding an object on the basis of at least one of the position and speed of the identified object, and travel along the avoidance path in operation S830. The traveling of the electronic device 100 according to the avoidance path may mean that the electronic device 100 moves according to the embodiment of FIGS. 4B, 5B, 6B, and 6C.

The electronic device 100 may control the electronic device 100 to travel along the first traveling path based on the current position of the electronic device 100 based on the identified object being distant by the predetermined distance or more based on the traveling of the electronic device 100 along the avoidance path in operation S940.

Figure 9:
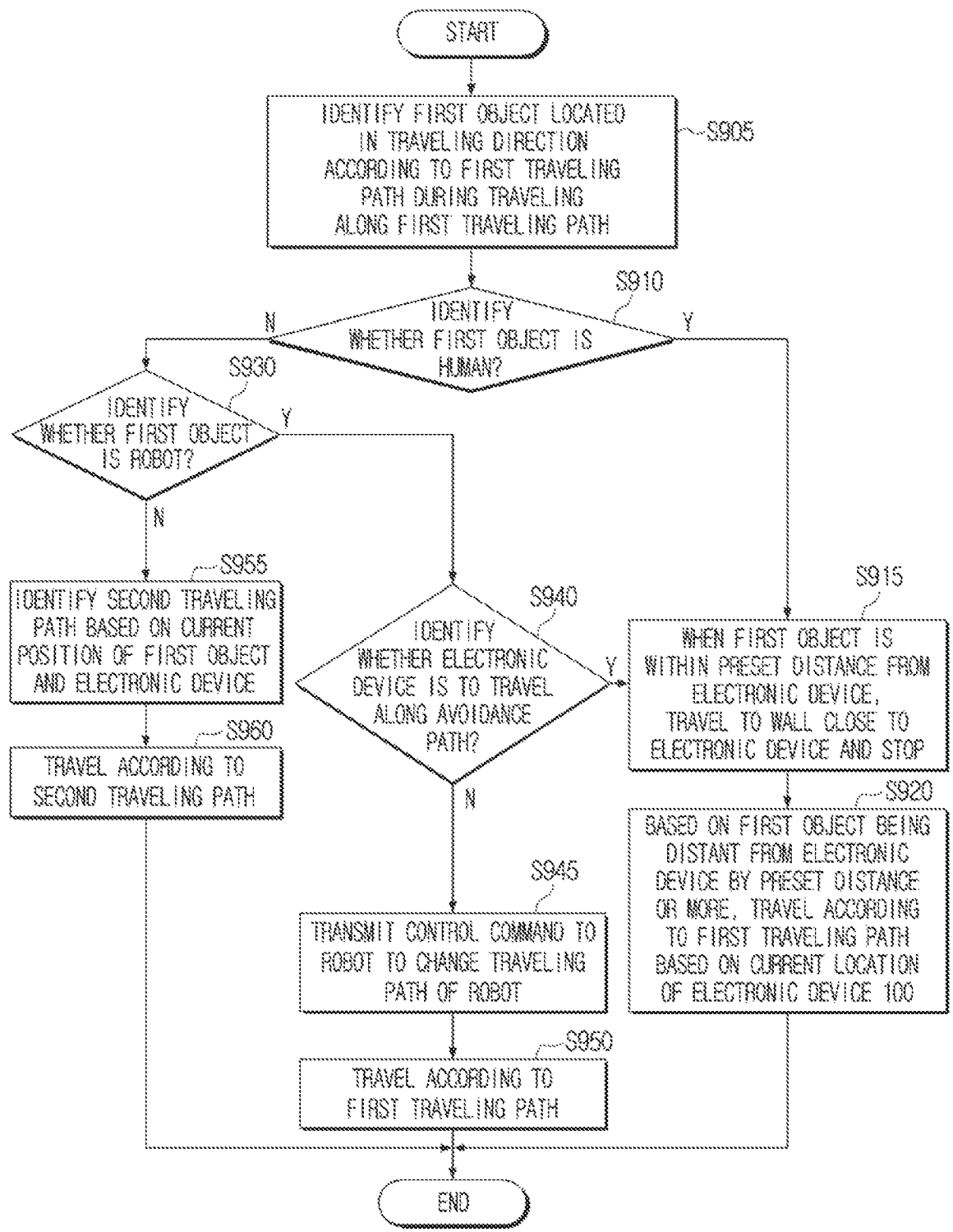
FIG. 9 is a flowchart chart illustrating an embodiment of changing a traveling path by identifying a type of an object interfering with traveling according to an embodiment of the disclosure.

FIG. 9 is a flowchart chart illustrating an embodiment of changing a traveling path by identifying a type of an object interfering with traveling according to an embodiment of the disclosure.

In operation S905, the electronic device 100 may identify a first object located in a traveling direction according to a first traveling path during traveling along a first traveling path. The first object located in the traveling direction along the first traveling path may be an object that interferes with traveling along the first traveling path.

The electronic device 100 may identify whether the first object is a human in operation S910. For example, the electronic device 100 may identify whether the first object is a human based on an image obtained by capturing the first object by the camera.

Based on the identification that the first object is a human in operation S910-Y, based on the first object being within a preset distance (e.g., 1 m) from the electronic device 100, the electronic device 100 may travel to a wall close to the electronic device 100 and may stop in operation S915. Based on the first object being distant from the electronic device 100 by a preset distance or more, the electronic device 100 may travel according to the first traveling path based on a current location of the electronic device 100 in operation S920.

Based on the first object being not identified as a human in operation S910-N, the electronic device 100 may identify whether the first object is a robot in operation S930. For example, the electronic device 100 may identify whether the first object is a robot based on an image captured by the camera. For example, the electronic device 100 may identify that the first object is a robot based on the communication connection with the first object.

Based on the first object being identified as a robot, the electronic device 100 may identify whether the electronic device 100 is to travel along the avoidance path in operation S940. The electronic device 100 may identify a device to travel in accordance with an avoidance path of the electronic device 100 and the robot.

Based on the electronic device 100 being identified as traveling according to the avoidance path in operation S940-Y, the electronic device may perform operation S915 and operation S920.

Based on the electronic device 100 being not identified as traveling along the avoidance path in operation S940-N, that is, based on the robot being identified as traveling along the avoidance path, the electronic device 100 may transmit a control command to the robot to change the traveling path of the robot in operation S945. The electronic device 100 may travel according to the first traveling path in operation S950.

Based on the first object being not identified as being a robot in operation S940-N, the electronic device 100 may identify the second traveling path based on the current position of the first object and the electronic device 100 in operation S955. The third traveling path may be a traveling path identified in consideration of the current position, first object, and set destination on the map corresponding to the environment in which the electronic device operates, assuming that the first object does not move. The electronic device 100 may recognize the first object as an obstacle, and may identify a different traveling path other than the path not drivable due to the first object as the second travel path. The electronic device 100 may travel according to the second traveling path in operation S960.

Figure 10:
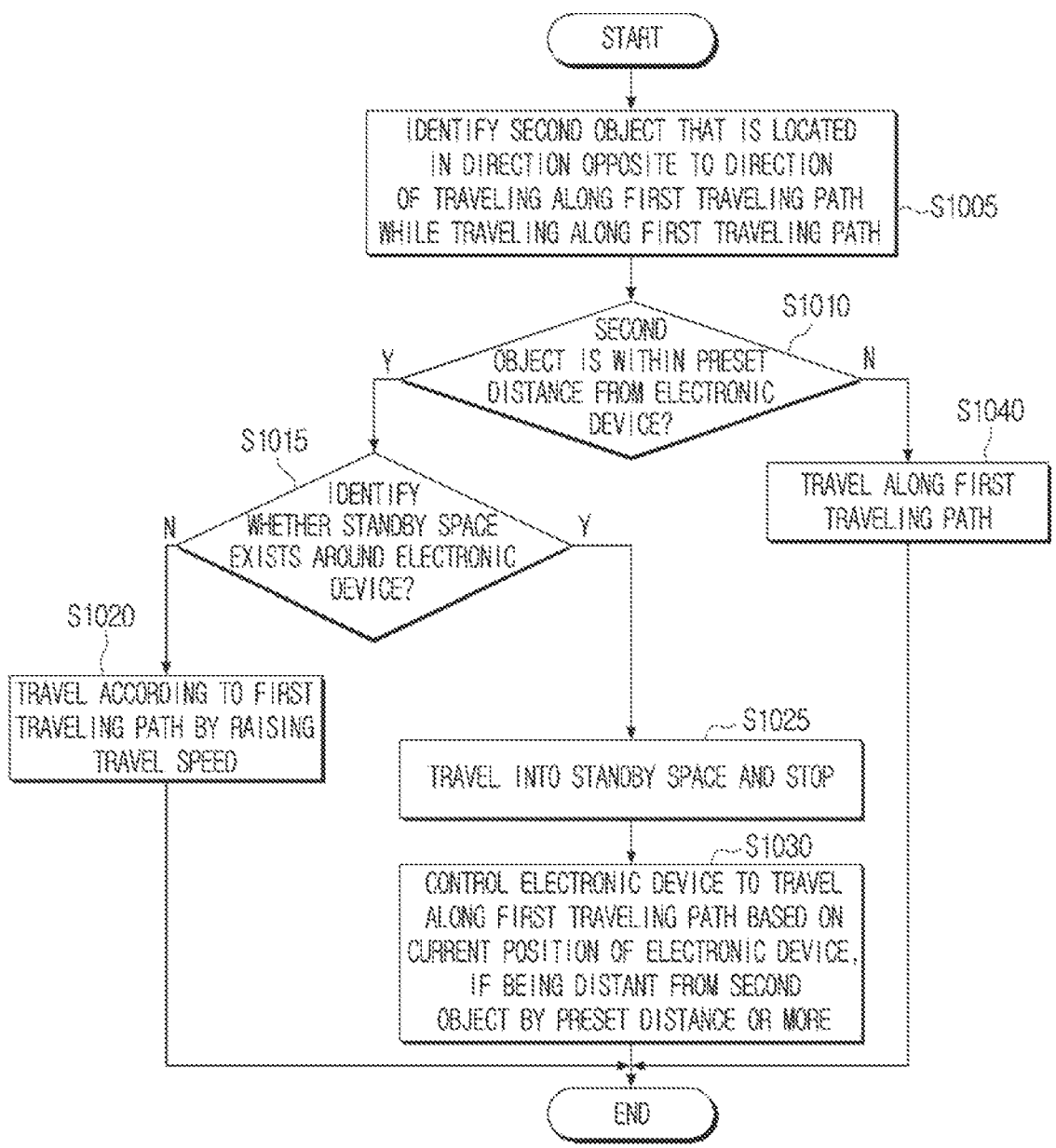
FIG. 10 is a flowchart illustrating an embodiment in which an object interfering with traveling is located in a direction opposite to the traveling direction of the electronic device according to an embodiment of the disclosure.

FIG. 10 is a flowchart illustrating an embodiment in which an object interfering with traveling is located in a direction opposite to the traveling direction of the electronic device according to an embodiment of the disclosure.

The electronic device 100 may identify a second object that is located in the opposite direction to the direction of traveling along the first traveling path while traveling along the first traveling path in operation S1005. The electronic device 100 may identify whether the second object is within the preset distance from the electronic device in operation S1010. The electronic device 100 may identify whether the electronic device 100 gets closer to the second object as the speed of the second object is faster than the traveling speed of the electronic device 100. Based on the second object being not within the set distance from the electronic device in operation S1010-N, the electronic device 100 may continue to travel along the first traveling path in operation S1040.

Based on the second object being within the predetermined distance from the electronic device in operation S1010-Y, the electronic device 100 may identify whether a standby space exists around the electronic device 100 in operation S1015.

Based on there being a standby space around the electronic device 100 in operation S1015-Y, the electronic device 100 may travel into the standby space and may stop in operation S1025. The electronic device 100 may control the electronic device 100 to travel along the first traveling path based on the current position of the electronic device, based on being distant from the second object by the preset distance (e.g., 1 m) or more in operation S1030.

Based on there being no standby space around the electronic device 100 in operation S1015-N, the electronic device 100 may raise the traveling speed and travel along the first traveling path (S1020). For example, the electronic device 100 may travel according to the first traveling path by increasing the traveling speed so as to be faster than the speed of the second object.

Figure 11:
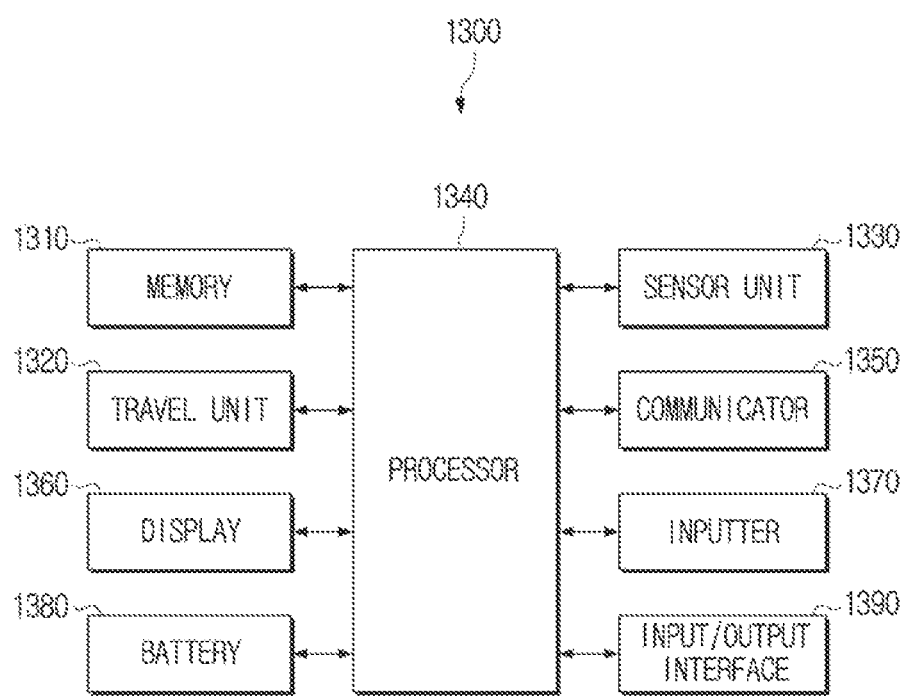
FIG. 11 is a diagram illustrating specific configurations of an electronic device according to an embodiment of the disclosure.

FIG. 11 is a diagram illustrating the detailed configuration of the electronic device according to one embodiment of the disclosure. Referring to FIG. 11, an electronic device 1300 may include a memory 1310, a traveling unit 1320, a sensor unit 1330, a processor 1340, a communicator 1350, a display 1360, an inputter 1370, a battery 1380 and an input and output interface 1390. However, such a configuration is exemplary, and in addition to such a configuration in carrying out this disclosure, a new configuration may be added or some configuration may be omitted. The memory 1310, traveling unit 1320, sensor unit 1330, and processor 1340 are described in detail with reference to FIG. 1, and the rest will be described below.

The communicator 1350 may communicate with an external device and an external server through various communication schemes. Communication of the communicator 1350 with an external device and an external server may include communication through a third device (e.g., a relay, a hub, an access point, a gateway, etc.).

The communicator 1350 may include various communication modules to perform communication with an external device. For example, the communicator 1350 may include a wireless communication module, for example, may include cellular communication using any one of the following, for example, long-term evolution (LTE), LTE advanced (LTE-A), a code division multiple access (CDMA), a wideband CDMA (WCDMA), and a universal mobile telecommunications system (UMTS), a wireless broadband (WiBro), or a global system for mobile communications (GSM), and the like. According to an embodiment, the wireless communication may include, for example, any one or any combination of wireless fidelity (Wi-Fi), Bluetooth, Bluetooth low energy (BLE), Zigbee.

According to an embodiment, the processor 1340 may receive a map (e.g., LiDAR map or a geometric map, or the like) corresponding to the environment in which the electronic device operates from an external device or an external server through the communicator 1350, and may store the map on the memory 1310. The processor 1340 may communicate with the robot through the communicator 1350 when the object that interferes with the traveling according to the first traveling path is a robot.

The display 1360 may display various information according to control of the processor 1340. The display 1360 may be implemented as various types of displays such as a liquid crystal display (LCD), light emitting diode (LED), Organic Light Emitting Diodes (OLED), Liquid Crystal on Silicon (LCoS), Digital Light Processing (DLP), or the like. In the display 1360, a backlight unit, a traveling circuit which may be implemented as a format such as an a-si thin-film transistor (TFT), low temperature poly silicon (LTPS) TFT, organic TFT (OTFT), or the like, may be included as well.

As an example of one embodiment, the display 1360 may be implemented as a touch screen in combination with a touch sensor. As an example, the display 1360 may display various user interfaces (UI) and icons. As an example of one embodiment, the display 1360 may display text corresponding to the user's voice command.

As an example, based on the object interfering with the traveling along the first traveling path being a human, the display 1360 may provide a UI for traveling to a preset destination. The UI for traveling to a set destination may include various texts such as "please pass the way", "please step aside, "I've to go to a living room. Please step inside," etc., or may include a variety of images or icons, etc.

The inputter 1370 may receive various user inputs and pass the user inputs to the processor 1340. The inputter 1370 may include a touch sensor, a (digital) pen sensor, a pressure sensor, a key. Touch sensors may use at least one method such as capacitive, decompressive, infrared, or ultrasonic.

The battery 1380 is a configuration for supplying power of the electronic device 1300, and the battery 1380 may be charged by a charging station. As an example, the battery 1380 may include a receiving resonator for wireless charging. As an example, the charging method of the battery 1380 may be a constant current constant voltage (CCV) charging method in which preset capacity is rapidly charged through a constant current (CC) charging method and remaining capacity is charged through constant voltage (CV) method, but the embodiment is not limited thereto an the charging may be implemented by various ways.

The I/O interface 1390 is a configuration for receiving audio signals from outside and outputting audio data to the outside. The I/O interface 1390 may include a microphone that receives an audio signal from the outside and an audio output unit that outputs audio data to the outside.

The microphone may receive audio signals from outside, and audio signals may include the user's voice commands. The audio outputter may output audio data by the control of the processor 1340. As an example, the audio output unit may output audio data corresponding to the user's voice command. As an example of one embodiment, based on an object interfering with traveling along the first traveling path being a human, the audio outputter may output audio data for traveling to a set destination. The audio outputter may include at least one of a speaker output terminal, a headphone output terminal and a Sony/Philips Digital Interface (S/PDIF) output terminal.

The disclosure includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components In describing the disclosure, a detailed description of known functions or configurations incorporated herein will be omitted as it may make the subject matter of the present disclosure unclear.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the claims. The expression of a singular includes a plurality of representations, unless the context clearly indicates otherwise.

In this document, the expressions "have," "may have," "including," or "may include" may be used to denote the presence of a feature (e.g., a component, such as a numerical value, a function, an operation, a part, or the like), and does not exclude the presence of additional features.

The expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

As used herein, terms such as "first," and "second," may identify corresponding components, regardless of order and/or importance, and are used to distinguish a component from another without limiting the components.

If it is described that a certain element (e.g., first element) is "operatively or communicatively coupled with/to" or is "connected to" another element (e.g., second element), it should be understood that the certain element may be connected to the other element directly or through still another element (e.g., third element).

On the other hand, if it is described that a certain element (e.g., first element) is "directly coupled to" or "directly connected to" another element (e.g., second element), it may be understood that there is no element (e.g., third element) between the certain element and the another element.

The expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

According to an embodiment, the term such as "module," "unit," "part," and so on is used to refer to an element that performs at least one function or operation, and such element may be implemented as hardware or software, or a combination of hardware and software. Further, except for when each of a plurality of "modules," "units," "parts," and the like need to be implemented in an individual hardware, the components may be integrated in at least one module or chip and implemented in at least one processor.

The various elements and regions in the drawings are schematically drawn. Accordingly, the technical spirit of the present disclosure is not limited by the relative size or spacing depicted in the accompanying drawings.

The various embodiments described above may be implemented in software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor. According to a software implementation, embodiments, such as the procedures and functions described herein, may be implemented with separate software modules. Each of the above-described software modules may perform one or more of the functions and operations described herein.

A method according to various embodiments described above may be stored in a non-transitory readable medium. Such a non-transitory computer-readable medium may be loaded and used in a variety of devices.

A non-transitory computer-readable medium refers to a medium that stores data semi-permanently, rather than a medium that stores data for a short moment, such as a register, cache, memory, etc., and refers to a medium readable by a device. Specifically, the programs for performing the various methods described above may be stored and provided in a non-transitory readable medium, such as a compact disc (CD), a digital video disc (DVD), a hard disk, a Blu-ray disc, a universal serial bus (USB), a memory card, a read-only memory (ROM), etc.

According to some embodiments, a method disclosed herein may be provided in a computer program product. A computer program product may be traded between a seller and a purchaser as a commodity. A computer program product may be distributed in the form of a machine-readable storage medium (e.g., a CD-ROM) or distributed online through an application store (e.g., PlayStore™, AppStore™). In the case of on-line distribution, at least a portion of the computer program product may be stored temporarily or at least temporarily in a storage medium, such as a manufacturer's server, a server in an application store, a memory in a relay server, and the like.

While the disclosure has been shown and described with reference to various example embodiments thereof, it will be understood by those skilled in the art that various changes in form and details may be made therein without departing from the spirit and scope of the disclosure as defined by the appended claims and their equivalents.

What is claimed is:

1. A method of an electronic device, comprising:
   identifying a first traveling path to a preset destination based on a map corresponding to an environment in which the electronic device operates;
   traveling along the first traveling path;
   identifying, using at least one sensor of the electronic device while traveling along the first traveling path, an object interfering with traveling according to the first traveling path based on a speed of the object being faster than a traveling speed of the electronic device;
   identifying an avoidance path to avoid the object based on a location of the object and the speed of the object;
   traveling according to the avoidance path; and
   based on the object being within at least a first preset distance from the electronic device while on traveling according to the avoidance path, resuming traveling according to the first traveling path based on a current location of the electronic device.

2. The method of claim 1, wherein the identifying the first traveling path comprises:
   obtaining a light detection and ranging (LiDAR) map corresponding to the environment in which the electronic device operates; and
   identifying the first traveling path based on the LiDAR map and the current location of the electronic device.

3. The method of claim 1, wherein the identifying the object comprises identifying, using the at least one sensor, the object located in a direction in which the electronic device travels according to the first traveling path, and
  wherein the identifying the avoidance path comprises, identifying, based on the map, the location of the object and the current location of the electronic device, the avoidance path to avoid the object.

4. The method of claim 3, wherein the traveling according to the avoidance path comprises, based on the object being less than a second preset distance from the electronic device, traveling to a wall in proximity to the electronic device and stopping the electronic device.

5. The method of claim 3, wherein the at least one sensor comprises a camera,
  wherein the method further comprises:
  identifying a type of the object based on the camera, and
  wherein the identifying the avoidance path comprises identifying the avoidance path to avoid the object based on the identified type of the object.

6. The method of claim 5, further comprising:
  based on the type of the object being identified as a human, traveling according to the first traveling path,
  wherein the traveling according to the avoidance path comprises:
  based on identifying that the human is located in a direction in which the electronic device travels while traveling according to the first traveling path, traveling to a wall in proximity to the electronic device and stopping the electronic device, and
  wherein the resuming the traveling according to the first traveling path comprises, based on the human being at least the first preset distance from the electronic device after the electronic device stops, resuming the traveling according to the first traveling path.

7. The method of claim 6, further comprising:
  based on the human being within the first preset distance from the electronic device for at least a preset time after the electronic device stops, outputting an audio message directed to the human.

8. The method of claim 5, further comprising:
  based on identifying that the type of the object is a robot, identifying whether the electronic device or the robot is to travel according to the avoidance path; and
  based on identifying that the robot is to travel according to the avoidance path, transmitting a control command to change a traveling path of the robot.

9. The method of claim 1, wherein the identifying the object comprises:
  identifying, using the at least one sensor, the object located in a direction opposite to a traveling direction of the electronic device; and
  based on the object being less than a second preset distance from the electronic device, identifying the object as interfering with traveling of the electronic device.

10. The method of claim 9, further comprising:
  based on identifying the object as interfering with the traveling of the electronic device, traveling according to the avoidance path or increasing the traveling speed of the electronic device.

11. An electronic device comprising:
  memory storing instructions;
  at least one sensor;
  a travel unit; and
  at least one processor
  wherein the instructions, when executed by the at least one processor, cause the electronic device to:
  identify a first traveling path to a preset destination based on a map corresponding to an environment in which the electronic device operates,
  control the travel unit to travel according to the first traveling path,
  identify, using an output of the at least one sensor while traveling according to the first traveling path, an object interfering with traveling according to the first traveling path based on a speed of the object being faster than a traveling speed of the electronic device,
  identify an avoidance path to avoid the object based on a location of the object and the speed of the object,
  control the travel unit to travel according to the avoidance path, and
  based on the object being within at least a first preset distance from the electronic device while traveling according to the avoidance path, control the travel unit to resume travel according to the first traveling path based on a current location of the electronic device.

12. The electronic device of claim 11, wherein the instructions, when executed by the at least one processor, further cause the electronic device to:
  obtain a light detection and ranging (LiDAR) map corresponding to the environment in which the electronic device operates, and
  identify the first traveling path based on the LiDAR map and the current location of the electronic device.

13. The electronic device of claim 11, wherein the instructions, when executed by the at least one processor, further cause the electronic device to:
  identify, using an output of the at least one sensor, the object located in a direction in which the electronic device travels according to the first traveling path, and
  based on the map, the location of the object, and the current location of the electronic device, identify the avoidance path to avoid the object.

14. The electronic device of claim 13, wherein the instructions, when executed by the at least one processor, further cause the electronic device to:
  based on the object being less than a second preset distance from the electronic device, control the travel unit to travel to a wall in proximity to the electronic device and stop the electronic device, and
  based on the object being at least the first preset distance from the electronic device after the electronic device stops, control the travel unit to resume travel according to the first traveling path based on the current location of the electronic device.

15. The electronic device of claim 13, wherein the at least one sensor comprises a camera, and
  wherein the instructions, when executed by the at least one processor, further cause the electronic device to:
  identify a type of the object based on the camera, and
  identify the avoidance path further based on the identified type of the object.

16. The electronic device of claim 15, wherein the instructions, when executed by the at least one processor, further cause the electronic device to:
  based on the type of the object being identified as a human, travel according to the first traveling path,
  wherein the instructions, when executed by the at least one processor, cause the electronic device to travel according to the avoidance path by:
  based on identifying that the human is located in a direction in which the electronic device travels while traveling according to the first traveling path, traveling to a wall in proximity to the electronic device and stop the electronic device, and wherein the instructions, when executed by the at least one processor, cause the electronic device to resume the traveling according to the first traveling path by:
based on the human being at least the first preset distance from the electronic device after the electronic device stops, resuming the traveling according to the first traveling path.

17. The electronic device of claim 16, wherein the instructions, when executed by the at least one processor, further cause the electronic device to:
based on the human being within the first preset distance from the electronic device for at least a second preset time after the electronic device stops, output an audio message directed to the human.

18. The electronic device of claim 15, wherein the instructions, when executed by the at least one processor, further cause the electronic device to:
based on identifying that the type of the object is a robot, identify whether the electronic device or the robot is to travel according to the avoidance path, and
based on identifying that the robot is to travel according to the avoidance path, transmit a control command to change a traveling path of the robot.

19. The electronic device of claim 11, wherein the instructions, when executed by the at least one processor, further cause the electronic device to identify the object by:
identifying, using the at least one sensor, the object located in a direction opposite to a traveling direction of the electronic device; and
based on the object being less than a third preset distance from the electronic device, identifying the object as interfering with traveling of the electronic device.

20. The electronic device of claim 19, wherein the instructions, when executed by the at least one processor, further cause the electronic device to:
based on identifying the object as interfering with the traveling of the electronic device, travel according to the avoidance path or increasing the traveling speed of the electronic device.

* * * * *